United States Patent [19]

Court

[11] 4,327,444
[45] Apr. 27, 1982

[54] MINIATURE TRANSMITTER AND METHOD FOR MAKING SAME

[75] Inventor: Patrick R. J. Court, Los Angeles, Calif.

[73] Assignee: TMX Systems Limited, Northern Ireland

[21] Appl. No.: 45,129

[22] Filed: Jun. 4, 1979

[51] Int. Cl.³ .......................................... H04B 1/034
[52] U.S. Cl. .................................. 455/100; 455/128; 455/129
[58] Field of Search .................... 455/63, 89, 95, 100, 455/106, 114, 90, 128, 129, 121, 123, 125, 107, 300, 100; 334/5, 6, 45; 343/718, 868

[56] References Cited

U.S. PATENT DOCUMENTS

| | | | |
|---|---|---|---|
| 2,319,627 | 5/1943 | Perlman | 455/100 |
| 2,549,259 | 4/1951 | Strommen | 455/300 |
| 2,924,705 | 2/1960 | Jones | 455/300 |
| 3,134,075 | 5/1964 | Langevin | 455/100 |
| 3,204,198 | 8/1965 | Backnick | 334/45 |
| 3,277,377 | 10/1966 | Guyton et al. | 455/125 |
| 3,902,118 | 8/1975 | Ikrath | 343/718 |
| 4,004,228 | 1/1977 | Mullett | 455/89 |

*Primary Examiner*—Tommy P. Chin
*Attorney, Agent, or Firm*—Gottlieb, Rackman & Reisman

[57] ABSTRACT

There is disclosed a miniature hand-held radio-frequency transmitter. An operating frequency is determined by a lumped-circuit oscillator which feeds an antenna etched on the periphery of the circuit board. The antenna is tuned to a frequency which is slightly above the second harmonic of the operating frequency, it being the second harmonic which is radiated. By slightly mis-tuning the antenna, the effects of an enveloping hand are minimized. The clasping of the transmitter by a human hand results in the absorption of some of the radiated power, but hand-capacitance effects also shift the center frequency of the antenna characteristic toward the second harmonic of the operating frequency, thus increasing the radiated power. In this way the signaling range under free-space conditions is the same as that under operating conditions. The oscillator circuit can thus be adjusted for maximum power output under free-space conditions within the guidelines of F.C.C. Regulations, without the signaling range being appreciably reduced under operating conditions. The radiated frequency is not appreciably affected by hand capacitance effects because it is determined by a lumped-circuit oscillator.

40 Claims, 4 Drawing Figures

MINIATURE TRANSMITTER AND METHOD FOR MAKING SAME

This invention relates to radio-frequency transmitters, and more particularly to miniature hand-held transmitters, and methods for making them.

In the co-pending application of Sassover et al, Ser. No. 045,119 entitled "Automobile Anti-Theft System", filed on June 4, 1979 and assigned to the assignee of this application, which Sassover et al application is hereby incorporated by reference, there is disclosed an anti-theft system for automobiles. Operation of a hand-held transmitter results in the transmission of a unique code in the form of a 100% modulated radio-frequency carrier, which code is detected by a receiver in an automobile. Upon receipt of a first code transmission, the receiver causes the ignition system of the automobile to be disabled, as well as controlling several other operations. A second transmission of the same coded signal results in disarming of the anti-theft system, as well as several other operations.

For a system of this type to be practical, it is desirable for the transmitter to be of very small size. While a woman may carry the transmitter in her handbag and thus size may not be of the utmost importance, it will usually be carried by a man in one of his pockets—in which case size becomes very important. In addition to small size, the transmitter should have a maximum signaling range (within the limits allowed by F.C.C. Regulations) and good frequency stability. Low cost is also an important objective.

But there are various "conflicts" in the several objectives. If the transmitter is to be of low cost, a crystal may not be used as a frequency-determining element; the oscillator must be "free-running", that is, it must utilize lumped-circuit components to establish its operating frequency. But because of the compact size of the transmitter, the proximity of the operator's hand to the circuit elements tends to affect the operating frequency principally through hand-capacitance effects, something which is usually avoided only by utilizing a crystal oscillator. Nor can the unit be completely shielded to avoid such effects, or else there would be little radiated power.

In the preferred embodiment of the invention, power radiation is accomplished by utilizing an antenna loop which is an etched circuit trace extending around the periphery of the printed circuit board on which the various components are mounted in the transmitter housing (although a wire loop can be used). In some inexpensive transmitters of this type, such as those used in electronic garage door openers, this kind of antenna loop forms the inductive portion of the frequency-determining tuned circuit of the oscillator. But because conventional garage door transmitters are relatively large, they may be designed such that the operator's hand does not envelop the antenna loop during operation, and satisfactory frequency stability may therefore be achieved. But the transmitter of the illustrative embodiment of the invention measures only 1.5"×2.7"×0.6", and during operation the transmitter is completely enclosed. The physical separation of the hand from the antenna loop is less than ⅛" and, if the loop is used as part of the frequency-determining circuit, serious detuning of the operating frequency may result—as much as 10 MHz around a center frequency of 340 MHz (the center frequency in the illustrative embodiment of the invention). The 3-dB bandwidth of a typical receiver may be only approximately 2 MHz, and therefore the transmitter stability should be in the order of 1 MHz, under worst-case conditions. The RF portion of the transmitter of my invention achieves the requisite stability, despite the fact that a single transistor is utilized without the benefit of a crystal.

The key to the operation is that the antenna loop is tuned to about twice the oscillator frequency, and it does not form part of the oscillator circuit, even though it is coupled into the collector of the oscillator transistor. The frequency-determining tuned circuit is a positive feedback configuration coupled across the base-emitter junction of the transistor. The oscillator frequency is actually one-half of the desired radiation frequency, 170 MHz in the illustrative embodiment of the invention. The transistor, in addition to being the active element in the oscillator, also acts as a frequency-doubler; the collector circuit, including the etched antenna, is tuned to approximately the second harmonic of the oscillator frequency, 340 MHz. The capacitance effects introduced by the operator's hand do change the antenna tuning. However, the radiated frequency is determined by the lumped circuit elements and the fact that the transistor doubles the operating frequency. Thus the transmitted frequency is only minimally affected by the operator's hand. (As will be described below, hand-caused antenna detuning, which is certain to occur, is actually used to advantage, and transmitted frequency stability is further improved by the use of shielding.) In practice, an overall oscillator frequency stability of 170 MHz±0.25 MHz can be achieved, which translates to a radiated frequency stability of 340 MHz±0.5 MHz. Furthermore, because of the compact nature of the 170-MHz oscillator components, particularly the oscillator coils, they do not radiate efficiently, thus minimizing undesired radiation of a 170-MHz frequency. The selectivity of the tuned circuit formed by the antenna loop tuned to 340 MHz also minimizes undesired radiation of the 170-MHz fundamental, as well as all other undesired harmonics such as the third.

The antenna loop is not actually tuned to a frequency of 340 MHz. Instead, it is tuned approximately 2% higher, to a frequency of 347.5 MHz. The reason for this is that the presence of the operator's hand, which envelops the transmitter during operation, has the effect of reducing the radiated power, in comparison with a transmitter operating in free space. The human hand is a partial conductor and, when enveloping the transmitter, absorbs some power through eddy current effects. At the same time, hand-capacitance effects detune the antenna loop to a somewhat lower frequency than that existing under free-space conditions. Were the free-space tuning of the antenna loop adjusted to 340 MHz, the total loss of radiated power due to the two hand effects (detuning and power absorption) would be sufficient to markedly reduce the effective signaling range as compared to the range under free-space conditions. But by tuning the antenna loop to a somewhat higher frequency under free-space conditions, the free-space radiation is reduced because the carrier frequency is on the slope of the antenna characteristic. The oscillator gain is adjusted in the factory to increase the free-space radiated power to the maximum permissible under F.C.C. Regulations. When the transmitter is then enveloped by the hand, the hand capacitance lowers the tuned frequency to approximately its desired center frequency of 340 MHz and the radiated power from the loop increases. This increase in radiated power by shifting the peak of the antenna response towards the carrier frequency compensates for the loss due to absorption by the operator's hand. By choosing a free-space antenna frequency of 347.5 MHz, the two hand effects almost exactly counter-balance each other and the transmitter signaling range is constant (and a maximum) independent of whether the transmitter operates in free space or is clasped tightly by the operator.

It should be noted that no matter how the antenna is detuned, the second harmonic component generated by the oscillator circuit remains relatively constant (340 MHz±0.5 MHz), since a fixed carrier frequency is necessary.

Further objects, features and advantages of my invention will become apparent upon consideration of the following description in conjunction with the drawings, in which:

FIG. 1 is the same as FIG. 1 of the Sassover et al application, and FIGS. 2A–2C are the same as FIGS. 1A–1C of the Sassover et al application. The present invention pertains not to the manner in which a coded signal is actually developed, but rather to the radio-frequency portion of the transmitter—which has wide application and can be used with other coding circuits.

Figure 1:
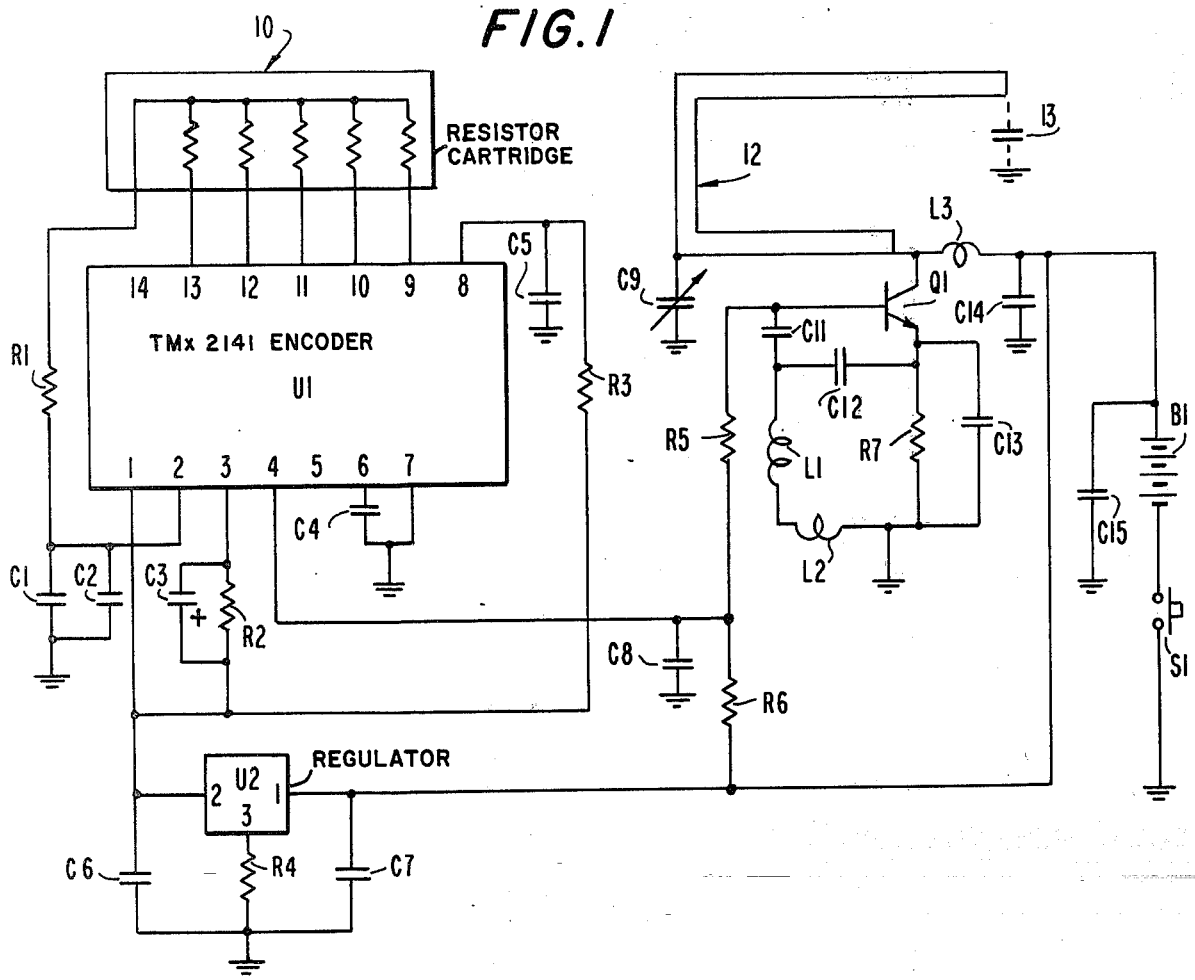
FIG. 1 is a schematic of the transmitter circuit.

The overall transmitter of FIG. 1 utilizes as chip U1 the TMX 2141 encoder available from the assignee of this application, TMX Inc., 1100 Glendon Avenue, Los Angeles, Calif. The receiver utilizes a comparable decoder chip (TMX 2151); the receiver will not be described herein, and reference may be made to the Sassover et al application for a preferred receiver.

When push button switch S1 is operated, power is supplied by battery B1 (a six-volt supply comprising four silver-oxide watch cells) to regulator chip U2. This chip supplies power to encoder U1 which then generates a start pulse, followed by five pulses whose widths are determined by the resistor values in code cartridge 10. For an understanding of the present invention, it is not necessary to appreciate the manner in which the circuitry on the left side of FIG. 1 operates. Suffice it to say that whenever a pulse is to be transmitted, pin 4 of chip U1 is caused to "float"; otherwise, chip U1 grounds pin 4. It is only the radio-frequency section of the transmitter unit which is claimed as an invention herein.

Power for the oscillator is derived from battery B1 when push button S1 is operated. Capacitor C15 bypasses the battery supply so that undesirable RF oscillations are attenuated. The six-volt potential is applied through inductor L3 to the collector of transistor Q1, and through resistors R6 and R5 to the base of transistor Q1. As long as pin 4 of chip U1 is floating, transistor Q1 oscillates; when pin 4 is grounded, the base-emitter junction of transistor Q1 has no forward bias and the transistor remains off.

The antenna loop 12, consisting of a trace etched on the periphery of the printed circuit board, is tuned to approximately the desired radiation frequency by a combination of stray capacitance 13 and adjustable trimmer capacitor C9. This latter capacitor is tapped approximately one-third along the length of the antenna loop in order to utilize a practical trimmer value and range. Inductor L3 is a matching inductance which serves to match the relatively low output impedance of transistor Q1 to the relatively high impedance of the antenna loop. Capacitor C14 is a conventional by-pass capacitor.

Inductors L1 and L2, in series, form the oscillator inductance. Inductor L2, the smaller of the two, is adjusted to allow a "vernier" adjustment of frequency during alignment. The two inductors are tuned to 170 MHz by capacitors C12 and C13 in series. The two capacitors form an impedance matching circuit to match the low impedance of the emitter of the transistor to the high impedance of the tuned circuit which is coupled to the base of the transistor by capacitor C11. Positive feedback exists between the emitter and base, and the voltage gain arising because of the impedance ratio of capacitors C12 and C13 is sufficient to sustain oscillation at 170 MHz across the tuned circuit. The values of capacitors C11, C12 and C13 are chosen to maximize second harmonic distortion in the emitter-base junction of the transistor, since it is the second harmonic component which is amplified in the collector circuit of transistor Q1 (the antenna loop tuned to 347.5 MHz).

The emitter bias resistor R7 is selected in the factory during alignment of the transmitter so that the radiated power is the maximum allowed by F.C.C. Regulations. (The small physical size of the transmitter generally militates against use of a potentiometer for resistor R7 for the purpose of adjusting the power.)

When pin 4 of chip U1 is grounded, transistor Q1 is held off. But whenever a pulse is to be transmitted, the voltage at pin 4 rises toward the battery supply because of the action of pull-up resistor R6. Transistor Q1 then has a positive base-emitter bias and oscillates at full power. The transistor thus generates a carrier which is 100% amplitude modulated by the start and code pulse sequence generated by chip U1.

The antenna loop is tuned in the factory approximately 2% higher than the second harmonic frequency, to a frequency of 347.5 MHz. Resistor R7 is adjusted in the factory to increase the free-space radiated power to the maximum permissible under F.C.C. Regulations. As described above, when the transmitter is then enveloped by the hand, the hand capacitance lowers the tuned (antenna) frequency to approximately its desired center frequency of 340 MHz and the radiated power from the loop increases. This increase in radiated power by shifting the peak of the antenna response towards the carrier frequency compensates for the loss due to absorption by the operator's hand. By choosing a free-space antenna frequency of 347.5 MHz, the two hand effects almost exactly counterbalance each other and the transmitter signaling range is constant (and a maximum) independent of whether the transmitter operates in free space or is clasped tightly by the operator.

Figure 2C:
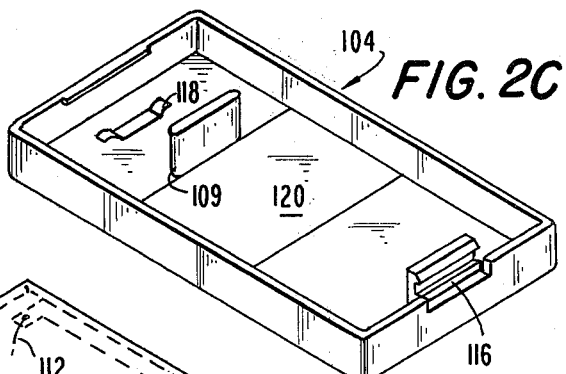
FIGS. 2A–2C depict the three parts of the transmitter.
Figures 2A, 2B:
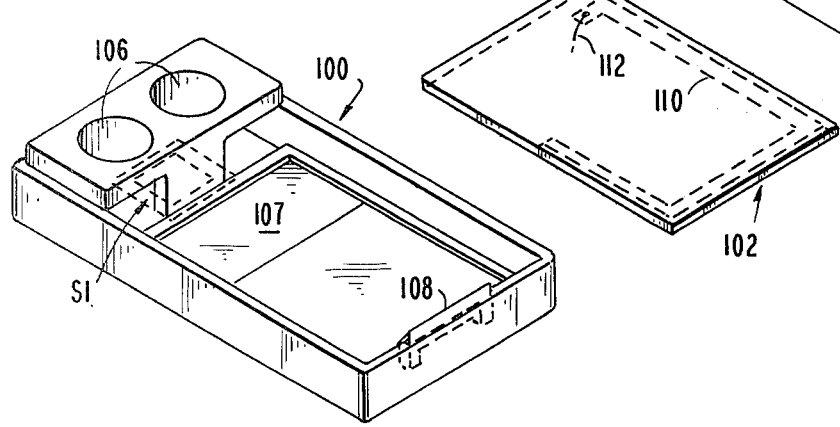

The transmitter unit itself is shown in FIGS. 2A–2C. The unit includes a base section 100 and a cover section 104. The base includes a lip 108 and the cover includes a snap-tab 116 so that the two units may be snapped together as is known in the art. The base has two holes 106 in which four batteries may be placed, as is also known in the art. A printed circuit board 102 fits within the base, and is connected to the batteries. A clip 118 on the cover serves to connect the two pairs of batteries in series with each other. Ledge 109 in the cover bears down against circuit board 102 and holds it in place. The circuit board is not shown in FIG. 2B as containing any of the circuit components, although it is to be understood that they are all mounted on it. FIG. 2B is shown primarily for its depiction of the antenna loop 110 which is etched from the copper foil of the circuit board. The antenna is shown connected by conductor 112 (to the collector of transistor Q1 in FIG. 1).

The effects of hand capacitance are minimized by providing partial shielding of the components which comprise the oscillator. A sheet of copper foil 107 is affixed inside the plastic base 100, and another copper sheet (not shown) is disposed underneath insulating sheet 120 on the cover. The two sheets partially enclose the oscillator components—but not the antenna loop itself. The pushbutton S1 is shown in phantom in FIG. 2A; it is mounted on the face of base section 100 of the transmitter unit.

The values of the circuit components (in ohms, picofarads and nanohenrys) in the illustrative embodiment of the invention are as follows:

| R1 | 470 | C8 | 1000 |
|---|---|---|---|
| R2 | 8.2M | C9 | 1.7-6.0 |
| R3 | (test) | C11 | 3.3 |
| R4 | 68 | C12 | 4.7 |
| R5 | 4.7K | C13 | 47 |
| R6 | 33K | C14 | 1000 |
| R7 | (test) | C15 | 1000 |
| C1 | .33uF | L1 | 70 |
| C2 | (test) | L2 | 41 |
| C3 | 2.2uF | L3 | 10 |
| C4 | 1000 | Q1 | MPS H-10 |
| C5 | .33uF | U1 | TMX 2141 |
| C6 | 1000 | U2 | 78L26 AWC |
| C7 | 1000 | | |

The objective is to detune the antenna during the manufacturing process by an amount sufficient to cause the antenna to resonate at the radiated frequency when its center frequency is shifted by hand capacitance effects. Generally speaking, this requires detuning of the antenna by at least 2 dB i.e., the antenna is detuned so that its center frequency (without an enveloping hand) is higher than the radiated frequency by an amount representing at least a 2 dB drop on the antenna characteristic from the peak to the level at the radiated frequency. A broad range for the detuning is 2-6 dB, with at least 3 dB being usual; in actual practice detuning by 4-5 dB has been found to give optimum results.

The frequency immunity from hand effects, through the use of a frequency multiplier, comes about mainly because of the compact nature of the lumped-circuit components used in the oscillator circuit, particularly the oscillator coils, and the shielding offered by the two copper foil sheets. Should a crystal oscillator be used, offset tuning of the antenna would still minimize hand effects on radiated power. In this case a frequency multiplier would not be needed to eliminate frequency shifts due to hand effects, but might be necessary to achieve a high radiated frequency.

Although the invention has been described with reference to a particular embodiment it is to be understood that this embodiment is merely illustrative of the application of the principles of the invention. For example, the antenna loop may be a wire rather than an etch on the printed circuit board; in fact, the use of a circuit board is not even necessary. Thus it is to be understood that numerous modifications may be made in the illustrative embodiment of the invention and other arrangements may be devised without departing from the spirit and scope of the invention.

What I claim is:

1. A miniature hand-held radio-frequency transmitter comprising a housing; a fixed-frequency transmitter circuit mounted within said housing; battery means within said housing for powering said transmitter circuit; and switch means on the exterior of said housing, when operated, for controlling said transmitter circuit to generate a predetermined frequency; characterized by said transmitter circuit having a detuned antenna which is fed a signal which is integrally related, but not equal, to said predetermined frequency and which is tuned to a frequency which is slightly different from said signal such that the power radiated by the detuned antenna is at a level lower than the maximum power which would otherwise be radiated thereby, the clasping of said housing by a hand shifting the center frequency of the antenna characteristic toward the frequency of said signal such that absorption of radiated power by an enveloping hand is automatically compensated by hand-capacitance effects which shift the center frequency of the antenna characteristic toward the frequency of said signal so that the radiated power is approximately the same and equal to said lower level whether the transmitter operates in free space or is clasped by a hand.

2. A miniature hand-held radio-frequency transmitter in accordance with claim 1 wherein said transmitter circuit is mounted on a circuit board, and said antenna is etched on the periphery of said circuit board.

3. A miniature hand-held radio-frequency transmitter in accordance with claim 2 wherein the frequency of said signal and said predetermined frequency are integrally related by a factor of two.

4. A miniature hand-held radio-frequency transmitter in accordance with claim 3 wherein said transmitter circuit includes lumped-circuit components to the exclusion of a crystal.

5. A miniature hand-held radio-frequency transmitter in accordance with claim 4 wherein said antenna is detuned by at least 2 dB.

6. A miniature hand-held radio-frequency transmitter in accordance with claim 4 wherein said antenna is detuned by at least 3 dB.

7. A miniature hand-held radio-frequency transmitter in accordance with claim 1 wherein the frequency of said signal and said predetermined frequency are integrally related by a factor of two.

8. A miniature hand-held radio-frequency transmitter in accordance with claim 7 wherein said transmitter circuit includes lumped-circuit components to the exclusion of a crystal.

9. A miniature hand-held radio-frequency transmitter in accordance with claim 8 wherein said antenna is detuned by at least 2 dB.

10. A miniature hand-held radio-frequency transmitter in accordance with claim 8 wherein said antenna is detuned by at least 3 dB.

11. A miniature hand-held radio-frequency transmitter in accordance with claim 1 wherein said transmitter circuit includes lumped-circuit components to the exclusion of a crystal.

12. A miniature hand-held radio-frequency transmitter in accordance with claim 11 wherein said antenna is detuned by at least 2 dB.

13. A miniature hand-held radio-frequency transmitter in accordance with claim 11 wherein said antenna is detuned by at least 3 dB.

14. A miniature hand-held radio-frequency transmitter in accordance with claim 1 further including metal sheets on opposed sides of said housing for shielding the operative parts of said transmitter circuit but not said antenna.

15. A miniature hand-held radio-frequency transmitter in accordance with claim 1 wherein said antenna is detuned by at least 2 dB.

16. A miniature hand-held radio-frequency transmitter in accordance with claim 1 wherein said antenna is detuned by at least 3 dB.

17. A method of making a miniature hand-held radio-frequency transmitter comprising the steps of fabricating a fixed-frequency transmitter circuit and mounting it within a housing; placing battery means within said housing for powering said transmitter circuit; placing switch means on the exterior of said housing which, when operated, controls operation of said transmitter circuit; and placing an antenna within said housing arranged to be fed a signal from said transmitter circuit; characterized by the step of deliberately detuning said antenna so that it is tuned to a frequency which is slightly different from the frequency of the signal fed thereto, such that the power radiated by the detuned antenna is at a level lower than the maximum power which would otherwise be radiated thereby, the clasping of said housing by a hand shifting the center frequency of the antenna characteristic toward the frequency of the signal fed thereto such that absorption of radiated power by an enveloping hand is automatically compensated by hand-capacitance effects which shift the center frequency of the antenna characteristic toward the frequency of said fed signal so that the radiated power is approximately the same and equal to said lower level whether the transmitter operates in free space or is clasped by a hand.

18. A method of making a miniature hand-held radio-frequency transmitter in accordance with claim 17 wherein said transmitter circuit is fabricated on a circuit board and said antenna is formed by etching it on the periphery of said circuit board.

19. A method of making a miniature hand-held radio-frequency transmitter in accordance with claim 17 wherein said transmitter circuit is fabricated of lumped-circuit components to the exclusion of a crystal.

20. A method of making a miniature hand-held radio-frequency transmitter in accordance with claim 19 wherein said antenna is detuned by at least 2 dB.

21. A method of making a miniature hand-held radio-frequency transmitter in accordance with claim 19 wherein said antenna is detuned by at least 3 dB.

22. A method of making a miniature hand-held radio-frequency transmitter in accordance with claim 17 wherein said transmitter circuit generates a frequency which is integrally related, by a factor of two, to the frequency of the signal which is fed to said antenna.

23. A method of making a miniature hand-held radio-frequency transmitter in accordance with claim 22 wherein said transmitter circuit is fabricated of lumped-circuit components to the exclusion of a crystal.

24. A method of making a miniature hand-held radio-frequency transmitter in accordance with claim 23 wherein said antenna is detuned by at least 2 dB.

25. A method of making a miniature hand-held radio-frequency transmitter in accordance with claim 23 wherein said antenna is detuned by at least 3 dB.

26. A method of making a miniature hand-held radio-frequency transmitter in accordance with claim 17 wherein said transmitter circuit is fabricated of lumped-circuit components to the exclusion of a crystal.

27. A method for making a miniature hand-held radio-frequency transmitter in accordance with claim 17 further including the step of placing metal sheets on opposed sides of said housing for shielding the operative parts of said transmitter circuit but not said antenna.

28. A method of making a miniature hand-held radio-frequency transmitter in accordance with claim 17 wherein said antenna is detuned by at least 2 dB.

29. A method of making a miniature hand-held radio-frequency transmitter in accordance with claim 17 wherein said antenna is detuned by at least 3 dB.

30. A miniature hand-held radio-frequency transmitter comprising a housing; a fixed-frequency transmitter circuit mounted within said housing; battery means within said housing for powering said transmitter circuit; switch means on the exterior of said housing, when operated, for controlling operation of said transmitter circuit; and an antenna; characterized by means for feeding to said antenna a signal derived from said transmitter circuit whose frequency is slightly different from the center frequency to which said antenna is tuned such that the power radiated by the detuned antenna is at a level lower than the maximum power which would otherwise be radiated thereby, the clasping of said housing by a hand shifting the center frequency of the antenna characteristic toward the frequency of said derived signal such that absorption of radiated power by an enveloping hand is automatically compensated by hand-capacitance effects which shift the center frequency of the antenna characteristic toward the frequency of said derived signal so that the radiated power is approximately the same and equal to said lower level whether the transmitter operates in free space or is clasped by a hand.

31. A miniature hand-held radio-frequency transmitter in accordance with claim 30 wherein said transmitter circuit is mounted on a circuit board, and said antenna is etched on the periphery of said circuit board.

32. A miniature hand-held radio-frequency transmitter in accordance with claim 31 wherein said transmitter circuit includes lumped-circuit components to the exclusion of a crystal.

33. A miniature hand-held radio-frequency transmitter in accordance with claim 32 wherein said antenna is detuned relative to the frequency of said derived signal by at least 2 dB.

34. A miniature hand-held radio-frequency transmitter in accordance with claim 32 wherein said antenna is detuned relative to the frequency of said derived signal by at least 3 dB.

35. A miniature hand-held radio-frequency transmitter in accordance with claim 30 wherein said transmitter circuit includes lumped-circuit components to the exclusion of a crystal.

36. A miniature hand-held radio-frequency transmitter in accordance with claim 30 wherein said antenna is detuned relative to the frequency of said derived signal by at least 2 dB.

37. A miniature hand-held radio-frequency transmitter in accordance with claim 30 wherein said antenna is detuned relative to the frequency of said derived signal by at least 3 dB.

38. A miniature hand-held radio-frequency transmitter in accordance with claim 37 further including metal sheets on opposed sides of said housing for shielding the operative parts of said transmitter circuit but not said antenna.

39. A miniature hand-held radio-frequency transmitter in accordance with claim 30 wherein said transmitter circuit is mounted on a circuit board, and said antenna is etched on the periphery of said circuit board, and further including metal sheets on opposed sides of said housing for shielding the operative parts of said transmitter circuit but not said antenna.

40. A miniature hand-held radio-frequency transmitter in accordance with claim 30 further including metal sheets on opposed sides of said housing for shielding the operative parts of said transmitter circuit but not said antenna.

* * * * *